United States Patent [19]

Dedrick

[11] 4,233,738
[45] Nov. 18, 1980

[54] GLIDE PAD FOR PORTABLE POWER SAW

[76] Inventor: Ted R. Dedrick, 6145 Lubbock Ave., La Mesa, Calif. 92041

[21] Appl. No.: 961,218

[22] Filed: Nov. 16, 1978

[51] Int. Cl.² .............................................. B27B 9/04
[52] U.S. Cl. .................................... 30/374; 428/136; 428/192; 428/900
[58] Field of Search .................... 428/62, 82, 88, 131, 428/900, 192, 136; 145/4; 30/374, 375, 376, 377, 388, 390, 391

[56] References Cited

U.S. PATENT DOCUMENTS

| 1,808,423 | 6/1931 | Macklanburg | 428/457 X |
| 3,303,861 | 2/1967 | Kane | 30/374 |
| 3,338,276 | 8/1967 | Reed | 30/374 X |
| 3,817,015 | 6/1974 | Frangos | 428/900 X |

Primary Examiner—Henry F. Epstein

[57] ABSTRACT

A non-abrasive glide pad is provided with a means of attachment to the table of a portable power saw. In a preferred embodiment the pad is secured to the saw table by means of a magnetic sheet bonded to the deck of the pad. In a second embodiment the entire deck is comprised of magnetic material. In a third embodiment the means of attachment to the saw is provided by strategically-positioned appendages of the pad deck that clip onto the table of the saw. In all embodiments the non-attaching bottom of the pad is provided with a surface of a non-abrasive nature such as that of a short-napped carpet.

4 Claims, 8 Drawing Figures

GLIDE PAD FOR PORTABLE POWER SAW

The present invention relates to a glide pad for a portable power saw. The table of said saw, being that weight-supporting part that is in direct contact with the work, may mar the finished surface of said work. This potential damage to the work is of constant concern when cutting doors, paneling, plastics and other materials with a finished surface. The present invention provides a non-abrasive interface between the table of the saw and the work, thereby preventing marring of the work. It is believed that no other product is available to provide this function.

The principle object of the invention is to provide a non-abrasive interface between the table of a portable power saw and the work.

Another object of the invention, characterized in a preferred and a second embodiment, is to provide an easy, yet secure magnetic means of attaching the interfacing glide pad deck to the table of the saw.

A further object, in a third embodiment, is to provide an easy, yet secure means of attaching the interfacing glide pad to the table of the saw by strategically-positioned appendages of the pad deck that clip onto the table of the saw.

Figure 1:
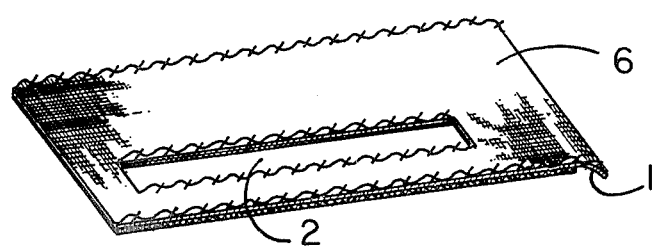
Figure 3:
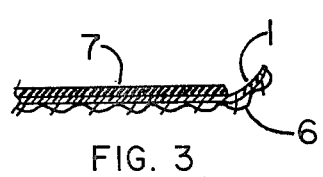
Figure 2:
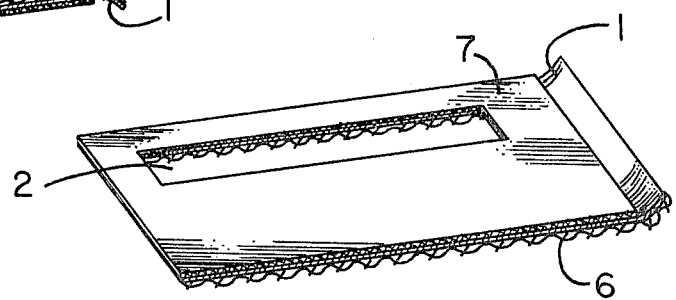
Figure 4:
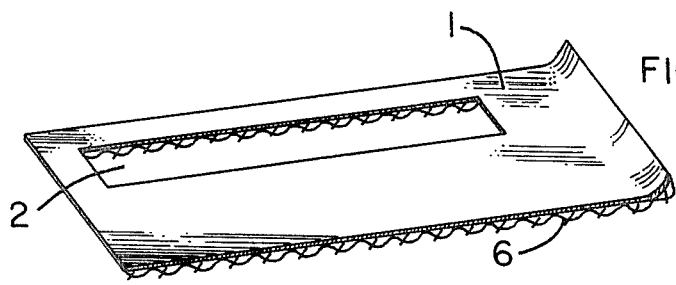
Figure 5:
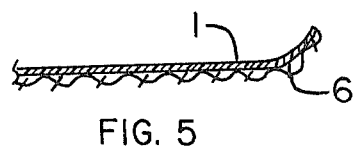
Figure 6:
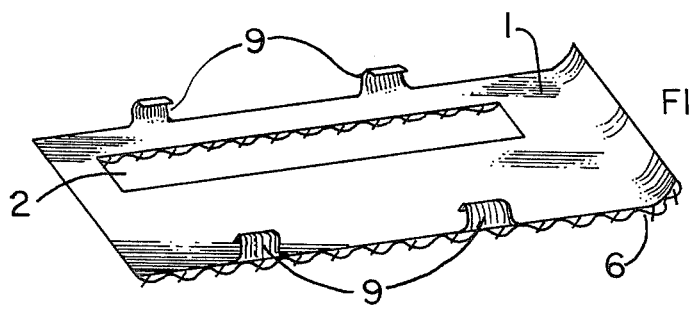
Figure 7:
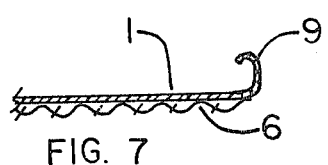
Figure 8:
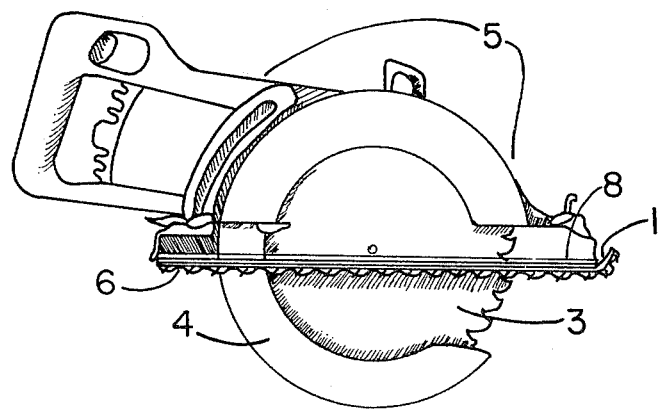

Other objects and advantages of the invention will be better understood hereinafter from a consideration of the specification with reference to the accompanying drawings forming part thereof, and wherein like numerals correspond to like parts throughout the several views of the invention, and wherein:

FIG. 1 is a bottom perspective view of the invention showing the non-abrasive surface of the pad, FIG. 2 is a top perspective view of the preferred embodiment of the invention showing the magnetic sheet means of attachment to the saw table, FIG. 3 is an enlarged side view of the preferred embodiment of the invention showing the deck, magnetic sheet and non-abrasive fabric in cross section, FIG. 4 is a top perspective view of an alternative embodiment showing the magnetic deck means of attachment, FIG. 5 is an enlarged side view of the alternative embodiment of the invention, illustrated in FIG. 4, showing the magnetic deck and non-abrasive fabric in cross section, FIG. 6 is a third embodiment of the invention in a top perspective view showing the appendages of the deck material that provide a clip-on means of attachment to the saw table, FIG. 7 is an enlarged end view of the third embodiment, illustrated in FIG. 6, showing the deck material, a typical appendage and the non-abrasive fabric in cross section, and FIG. 8 is a side view of the invention showing it in position on a typical portable power saw.

Referring specifically to the drawings, the glide pad characterizing the present invention comprises a deck (1), made of plastic, metal or other suitable material, having a strategically positioned slot (2) therein to allow protrusion clearance for the blade (3) and the guard (4) of the saw (5). To said deck (1) is bonded on the bottom, as shown in FIG. 1, a non-abrasive material (6) such as short, raised-nap carpet-like fabric.

On the top of said deck (1), shown in a preferred embodiment in FIGS. 2 and 3, is bonded a permanently magnetized sheet (7) of material such as Plastiform ® brand rubber-bonded magnetic sheet. Said magnetic sheet (7) provides a magnetic means of attaching the present invention to the table (8) of the saw (5).

In a second embodiment, shown in FIGS. 4 and 5, the entire deck (1) is comprised of a permanently magnetized material such as Plastiform ® brand rubber-bonded magnetic sheet.

Shown in FIGS. 6 and 7 is a third embodiment of the present invention wherein the deck (1) is made of plastic, metal or other suitable material and has strategically positioned appendages (9) that clip onto the table (8) of the saw (5), providing a mechanical means of attaching the invention to said saw (5).

Having thus described the invention, it is to be understood that certain modifications in the construction and arrangement of parts or materials thereof will be made, as deemed necessary, without departing from the appended claims.

Changes in size and configuration to enable the device to be used on other power tools, such as jig saws, table saws, routers, etc., should be obvious to those skilled in the art and will be made without departing from the appended claims.

I claim:

1. A glide pad for a portable power saw having a metallic table, comprising:
   (a) a substantially rigid planar deck of plastic or metal having an upturned leading edge conforming to the table of a portable power saw and including an elongated, longitudinally-extended slot to accommodated the blade of said saw;
   (b) a layer of non-abrasive material bonded to the bottom of said deck;
   (c) said deck having means for mounting same flush against the bottom of said table with said slot aligned with the blade of said saw.

2. A glide pad according to claim 1 wherein said mounting means comprises a layer of magnetic material defining substantially the entire upper surface of said deck.

3. A glide pad according to claim 1 wherein said mounting means comprises a plurality of clips spaced around the perimeter of said deck and positioned thereon to snap around the edges of said table in retaining relation thereto.

4. A glide pad according to claim 1 wherein said layer of non-abrasive material comprises a mat defining a multiplicity of close-set, substantially parallel fibers which define a substantially planar surface.

* * * * *